May 30, 1967  S. YAKSTIS  3,322,544
METHOD OF PREPARING FISH BAIT
Filed Sept. 17, 1963
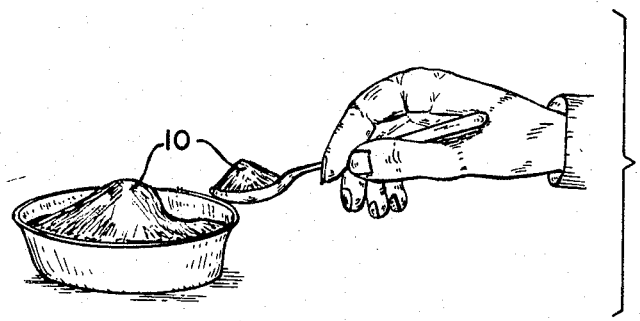
FIG. 1
FIG. 2
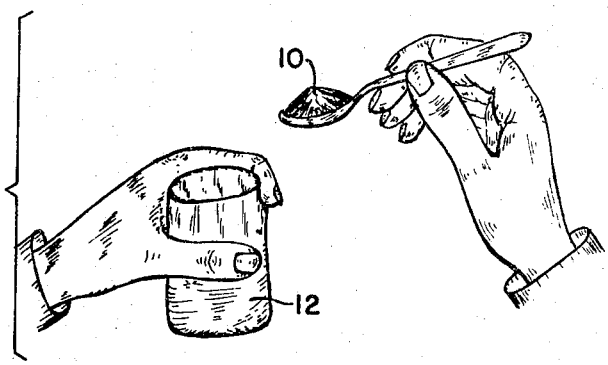
FIG. 3
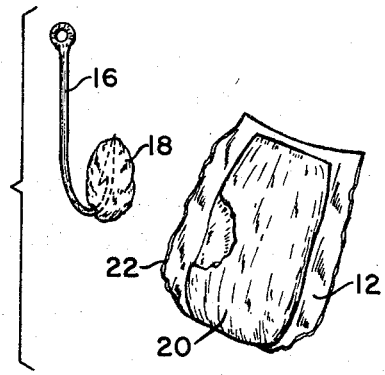
FIG. 4
INVENTOR.
STANLEY YAKSTIS
BY George Raymovich
HIS ATTORNEY

United States Patent Office 3,322,544
Patented May 30, 1967

3,322,544
METHOD OF PREPARING FISH BAIT
Stanley Yakstis, 131 S. 17th St.,
Pittsburgh, Pa. 15203
Filed Sept. 17, 1963, Ser. No. 309,441
2 Claims. (Cl. 99—3)

ABSTRACT OF THE DISCLOSURE

Fish bait of the type known as "dough balls" is prepared by mixing dry ingredients which are capable of storage without refrigeration and packaging the dry ingredients in a water permeable container. When it is desired to utilize the fish bait, the water permeable container is placed in boiling water and boiled for at least ten (10) minutes, after which the container is opened and dough balls are formed of the boiled contents. The dry ingredients include flour, cornmeal, sugar, vanilla extract and food coloring.

---

This invention relates to fish bait, and more particularly to preparing a fish bait which may be stored in a dry condition for long periods of time and then be readily adapted for use in fishing.

The present invention is directed to preparation of a fish bait commonly known as "dough balls." Dough balls are formed of a dough-like substance which is placed upon a fish hook to cover the hook and attract certain types of fish. In the present invention, I provide a particular mixture of ingredients which forms a dough ball that is attractive to catfish and carp.

In addition to the mixture which I have discovered, the present invention also contemplates the preparation of a mixture of dry ingredients that are the basic ingredients of the dough ball. I then store the basic, dry ingredients within a liquid permeable container where they may be stored in a dry state for extended periods of time. Because of the dry state of the ingredients, storage in the liquid permeable container can be maintained for a year or more without any spoilage of the dry ingredients.

With the dry ingredients stored in a liquid permeable container, I can readily prepare the dough balls for ultimate use merely by immersing the entire liquid permeable container in boiling water for a period of approximately ten to fifteen minutes. While in the boiling water, the ingredients are held together by the liquid permeable container, but the water can pass into the ingredients to boil the ingredients. The boiled ingredients, because of their confinement within the liquid permeable container, retain only enough water to form a relatively high viscosity paste material which, when the container is removed, retains its mass and shape.

In some instances, if the boiled ingredients are allowed to stand for long periods, the dough will harden to some extent. The dough, under those conditions, can be resoftened to a usable consistency by adding water and kneading for a short period of time.

The ingredients of my invention are placed within the liquid permeable container and the containers may be sold as instant fish bait. When it is desired to use the fish bait, the purchaser merely immerses the bait container in boiling water for a specified period of time, and thereafter opens the container to form dough balls of the particular size and shape required for his use.

With the foregoing considerations in mind, it is an object of this invention to provide a fish bait mixture which may be packed as dry ingredients in a liquid permeable container and thereafter be prepared for use by boiling the ingredients within the container.

Another object of this invention is to provide a fish bait mixture which may be stored as dry ingredients for extended periods of time.

Another object of this invention is to provide a fish bait mixture which is attractive to many types of fish including catfish and carp.

Another object of this invention is to provide a method of preparing fish bait which allows the bait to be stored for indefinte periods of time without spoilage and which permits use of the bait thereafter with a minimum of preparation effort.

These and other objects of this invention will become apparent as this description proceeds in conjunction with the attached drawing.

In the drawing:

FIGURE 1 is an illustration of the dry ingredients of my invention.

FIGURE 2 is an illustration of the dry ingredients of the invention being placed into a liquid permeable container.

FIGURE 3 is an illustration of the liquid permeable container of my invention being placed into boiling water to boil the dry ingredients.

FIGURE 4 is an illustration of the boiled ingredients of my invention with a portion of the ingredients removed and placed upon a fish hook as a dough ball.

Referring to the drawings, I prepare the mixture of dry ingredients 10 for my fish bait by first taking corn meal. With the corn meal I mix vanilla extract, the commercially available type which contains approximately 35% alcohol, and food coloring which contains propylene glycol and water. While the vanilla extract and food coloring are liquid, the quantities of these ingredients are such that when mixed with the corn meal, the resulting mixture is substantially dry, the liquid of the vanilla extract and food coloring being absorbed by the corn meal. To the mixture of corn meal, vanilla extract and food coloring, I add white flour and granulated sugar. The entire mixture of dry ingredients 10 are then thoroughly and completely mixed with each other to provide a homogeneous mixture. After the dry ingredients are so mixed, they are placed (FIGURE 2) in a liquid permeable container 12. In the drawings, a cloth bag 12 is shown as being representative of the liquid permeable container. The container could also be formed of liquid permeable paper of the type utilized to manufacture tea bags, or of a liquid permeable plastic substance formed into the shape of a rigid box or cylinder.

The liquid permeable container 12 is closed by means of sewing, staples, or the like (not shown) so that the dry mixture of ingredients is retained within the liquid permeable container 12.

When so prepared within the container 12, the dry ingredients may be stored for indefinte periods of time. I have stored ingredients of this type for many months without spoilage.

When it becomes time to utilize the fish bait, the fisherman needs to merely take the liquid permeable container 12 and immerse it in boiling water 14. The container 12 is allowed to remain in boiling water for at least ten minutes and may be boiled for fifteen minutes. During the boiling process, the dry ingredients mix with and absorbs some of the boiling water and form a paste-like substance of relatively high viscosity.

In FIGURE 4, a fish hook 16 is shown with a dough ball 18 formed thereon. The dough ball 18 is formed from the boiled ingredients 20 which have assumed the relatively high viscosity paste-like form. In FIGURE 4, the liquid permeable container 12 has been cut at 22 to expose the paste-like ingredients 20.

Once the boiling of the ingredients has been completed, the liquid permeable container is expendable and may be cut or otherwise removed from around the paste-like material. If a rigid container is utilized, the paste-like material may simply be removed from inside the rigid member.

As one example of my invention, the following quantities and ingredients were utilized:

2 tablespoons of corn meal.
2 tablespoons of white flour.
2 tablespoons of granulated sugar.
8 drops of vanilla extract.
8 drops of food coloring.

The corn meal, vanilla extract and food coloring are mixed together and then the sugar and white flour are added to this mixture and thoroughly mixed to form a homogeneous mixture of ingredients.

The ingredients are then packed into a cloth bag. The ingredients were then stored for several weeks. Following storage, the cloth bag was immersed in boiling water for ten minutes. When the bag was removed from the boiling water, and the cloth bag cut away, the ingredients were formed into a paste-like material of relatively high viscosity. This paste-like material was formed into dough balls and was utilized by placing the dough balls over fish hooks to fish successfully for catfish and carp. The size of the dough ball will be determined by the size of the fish hook that it is to cover.

As a second example of my invention, I have prepared fish bait utilizing the following quantities and ingredients:

1 cup of white flour.
¾ cup of corn meal.
½ cup of granulated sugar.
10 drops of vanilla extract.
10 drops of food coloring.

Again, the corn meal, vanilla extract and food coloring wer mixed together and the other dry ingredients, flour and sugar, were then added. After forming a homogeneous mixture, a portion of the ingredients were placed into a cloth bag. Following storage, the cloth bag was boiled by immersing in boiling water for fifteen minutes.

The cloth bag was cut away, leaving a mass of paste-like boiled ingredients. These ingredients were placed upon a fish hook as dough balls and were utilized to catch catfish and carp.

In each of the foregoing examples, yellow food coloring was utilized. I have found that yellow food coloring is particularly useful in preparing my fish bait. I have indicated the amount of coloring utilized in each of the examples. More or less coloring can be utilized to provide the exact color desired to catch a particular type of fish.

According to the provisions of the patent statutes, I have explained the principle and mode of utilization of my invention and have illustrated and described what I now consider to represent its best embodiment. However, I desire to have it understood that, within the scope of the appended claims, the invention may be practiced otherwise than as specifically illustrated and described.

I claim:
1. The method of preparing fish bait comprising the steps of:
 (a) mixing ingredients comprising corn meal, flour, sugar, and vanilla extract to form a dry mixture capable of storage for indefinite periods of time without refrigeration;
 (b) placing said dry mixture in a liquid permeable container for storage in a dry state for indefinite periods of time;
 (c) thereafter placing said liquid permeable container in boiling water for a period of at least ten minutes to boil said dry mixture;
 (d) opening said container to expose the boiled mixture therein; and
 (e) thereafter utilizing the boiled mixture from within said container as fish bait by separating and shaping portions of said boiled mixture into dough balls and placing said dough balls over the fish hooks.

2. The method of claim 1 wherein said dry mixture includes food coloring in addition to corn meal, flour, sugar, and vanilla extract.

References Cited

UNITED STATES PATENTS

| | | | |
|---|---|---|---|
| 135,113 | 1/1873 | Goodman | 99—3 |
| 871,935 | 4/1907 | Hanzel | 99—3 X |
| 1,291,614 | 1/1919 | Noxon | 99—3 |
| 1,366,509 | 1/1921 | Thiessen | 99—3 |
| 1,384,320 | 7/1921 | Hickson et al. | 99—3 |
| 2,449,322 | 9/1948 | Richardson | 99—3 |
| 2,555,088 | 5/1951 | Irwin | 99—3 |
| 2,693,417 | 11/1954 | Orth | 99—3 |
| 2,708,629 | 5/1955 | Judy | 99—3 |
| 2,932,571 | 4/1960 | Tribble | 99—2 |
| 2,932,572 | 4/1960 | Sarich | 99—3 |

OTHER REFERENCES

Baits, Bureau of Fisheries, Washington, D.C., page 4, January 1935.

Fishery Leaflet 28, Fish and Wildlife Service, Washington, D.C., pp 19, 20, March 1950.

A. LOUIS MONACELL, *Primary Examiner.*

D. DONOVAN, *Assistant Examiner.*